No. 690,146. Patented Dec. 31, 1901.
W. W. HARMON.
SAFETY BRAKE MECHANISM.
(Application filed Feb. 25, 1901.)
(No Model.) 2 Sheets—Sheet 1.
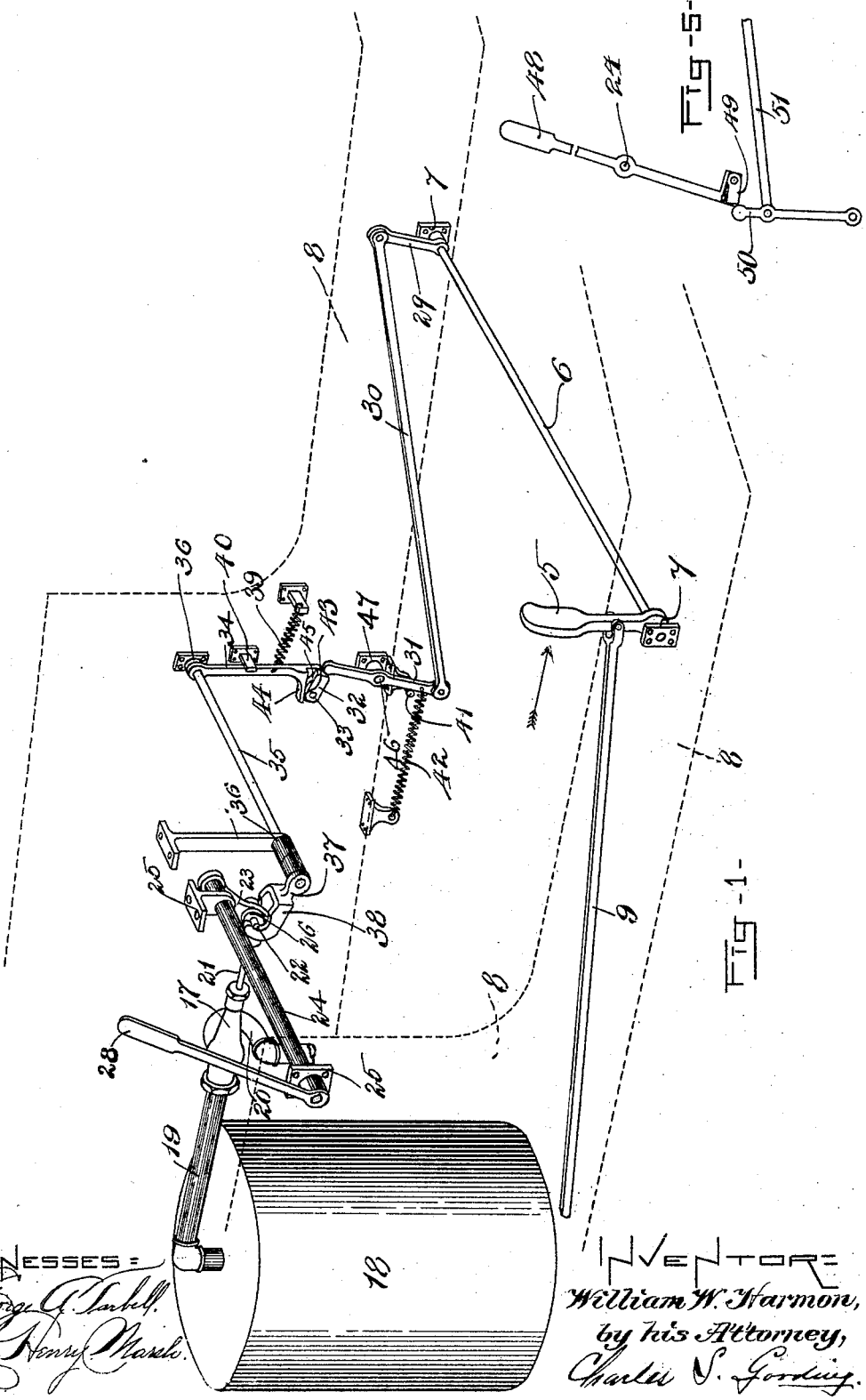
Witnesses:
George A. Isbell
Henry Marsh
Inventor:
William W. Harmon,
by his Attorney,
Charles S. Gording.

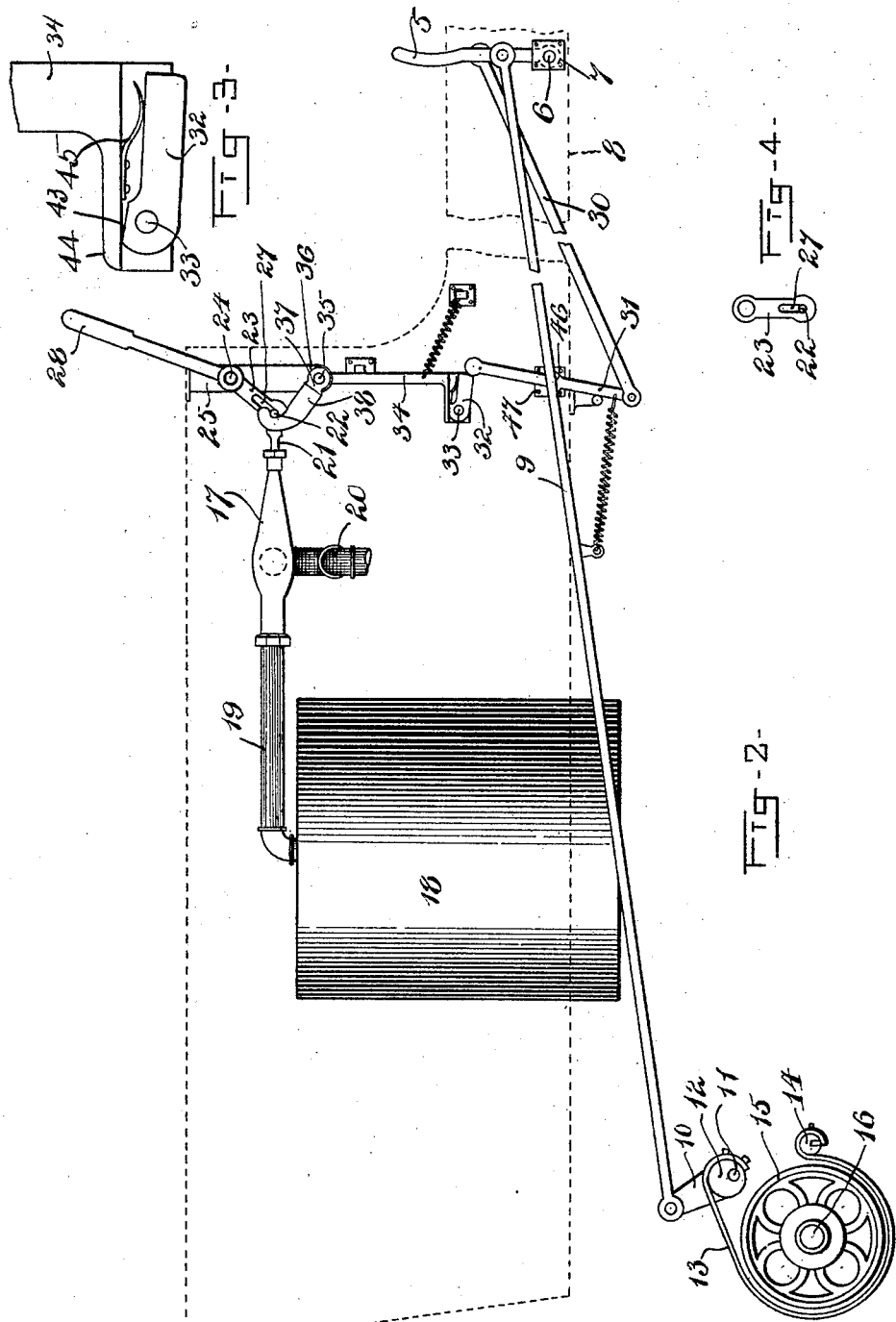

UNITED STATES PATENT OFFICE.

WILLIAM WILLMOTT HARMON, OF BOSTON, MASSACHUSETTS.

SAFETY-BRAKE MECHANISM.

SPECIFICATION forming part of Letters Patent No. 690,146, dated December 31, 1901.

Application filed February 25, 1901. Serial No. 48,688. (No model.)

*To all whom it may concern:*

Be it known that I, WILLIAM WILLMOTT HARMON, a citizen of the United States, residing at Boston, in the county of Suffolk and State of Massachusetts, have invented new and useful Improvements in Safety-Brake Mechanism, of which the following is a specification.

This invention relates to mechanism for conveyances propelled by steam, electricity, gasolene, or other motive power, and has for its object to shut off or disconnect said steam, electricity, or other motive power from the mechanism which propels said conveyance simultaneously with or immediately preceding the application of the brake to said mechanism. In conveyances of the character hereinbefore referred to as heretofore constructed the driver shuts off or disconnects said motive power from the engine by operating one lever or other disconnecting means and subsequently applies the brake with another lever. Many accidents have, however, resulted from the fact that the driver, through carelessness or forgetfulness, has neglected to shut off the motive power before applying the brake, and these accidents are especially liable to occur where it becomes necessary to stop the carriage quickly, as the driver becomes "rattled" and is liable to apply the brake before shutting off the power.

In the following specification I have described my invention, and in the drawings illustrated the same, as applied to a steam-carriage or automobile; but I do not wish to be understood as limiting my invention to its application to this particular kind of conveyance, as the same may be used by slight adaptations to existing conditions for conveyances using electricity, gasolene, or other motive power.

When the brake is applied to the automobile before closing the throttle, the result will be to throw the occupants forward over the dasher into the road. The carriage, left to itself, runs away, causing damage. If the brake is applied slightly without shutting the throttle, so that the results hereinbefore recited do not occur, the boiler will eject or "cough up" the water therein through the throttle into the cylinder and out through the exhaust, leaving the operator practically helpless, the consequence being that the boiler becomes practically empty and necessitates the filling thereof, which necessity is beyond the ability of all but the practical engineer to carry out.

The object of this invention is, therefore, to overcome the difficulties hereinbefore recited by preventing even the possible occurrence thereof.

The invention consists in an improved mechanism for applying the brake to vehicles propelled by steam, electricity, or other motive power, said mechanism so constructed and arranged as to shut off said motive power simultaneously with or immediately preceding the application of the brake to the propelling mechanism of said vehicle.

The invention further consists in mechanism constructed and arranged as hereinbefore set forth and also so constructed and arranged that the throttle may be manipulated independently of the brake mechanism.

The invention further consists in the combination and arrangement of parts set forth in the following specification, and particularly pointed out in the claims thereof.

Referring to the drawings, Figure 1 is a perspective view of my improved safety-brake mechanism with the throttle-valve and levers connected thereto, the outline of a portion of the carriage-body being shown in dotted lines. Fig. 2 is a detail side elevation of the boiler, throttle, and the lever connected to the brake mechanism, which closes said throttle, with the throttle open. Fig. 3 is an enlarged detail side elevation of the spring-latch 32. Fig. 4 is a detail side elevation of the rocker-arm 23. Fig. 5 is a detail side elevation of a modified form of the throttle-lever and actuating mechanism therefor.

Like numerals refer to like parts throughout the several views of the drawings.

In the drawings, 5 is the treadle or foot lever by which the brake is actuated. Said lever is fast to a treadle rock-shaft 6, which rocks in bearings 7 7, fast to the sides of the carriage-body 8, and is connected by a brake-rod 9 to a rock-lever 10, fast to a rock-shaft 11, having bearings (not shown) fast to the frame of the machine. The lever 10 has an eccentric hub 12 fast thereto, to which is attached one end of a friction-belt 13. The other end of said belt is fast to a fixed pin 14, and the intermediate portion thereof encircles a friction brake-pulley 15, fast to the rear axle 16 of the carriage.

The brake is applied by the operator pushing with his foot against the brake-lever 5 and rocking the lever 10 to the right, Fig. 2, thus coiling the strap 13 around the brake-pulley 15 and applying friction thereto to stop the carriage.

The hereinbefore-described brake mechanism is old and well known to those skilled in the art. The throttle-valve 17 is connected to the boiler 18 by a pipe 19 and to the engine by a pipe 20. The stem 21 of the valve 17 is connected by a pin 22 to a rocker-arm 23, fast to a throttle rock-shaft 24, arranged to rock in bearings 25, fast to the carriage-body 8. The valve-stem 21 is forked at 26 to embrace the end of the arm 23. The pin 22 is fast thereto and slides in a slot 27 in the rocker-arm 23. The throttle rocker-shaft 24 has a hand-lever 28 fast thereto, by means of which the throttle-valve is controlled, said lever being thrown back to close the valve and forward to open it. The throttle-valve 17 is so arranged and constructed that when the valve-stem is drawn forward or to the right, Figs. 1 and 2, the valve will be closed, and vice versa.

The hand-lever 28 is used in the ordinary manipulation of the throttle-valve; but in order to close said throttle upon the application of the brake or just preceding the same I provide a rocker-arm 29, fast to the treadle rock-shaft 6 and connected by a link 30 to the lower end of a lever 31, pivoted at 46 to a bracket 47, fast to the carriage-body 8. When the brake-treadle is pushed forward, as hereinbefore described, in order to apply the brake, the upper end of the lever 31 will be rocked to the left and will contact with a spring-latch 32, pivoted at 33 to a rocker-arm 34, fast to an intermediate rock-shaft 35. The intermediate rock-shaft 35 rocks in bearings 36 36, fast to the carriage-frame 8, and has a rocker-arm 37 fast thereto. The rocker-arm 37 is forked at 38 to engage the two projecting ends of the pin 22, and when the lever 31 contacts with the latch 32 it rocks the arm 34 to the left, Fig. 2, rocking the intermediate rock-shaft 35 and the rocker-arm 37 from the position shown in Fig. 2 toward the right in said figure, drawing the valve-stem 21 to the right and closing the throttle. The lever-arm 31 rocks the rocker-arm 34 to the left until the lower end of the latch 32 clears the upper end of said lever, whereupon the rocker-arm 34 is drawn back by a spiral spring 39 until it strikes against the stationary stop-pin 40. When the operator releases the treadle, the lever 31 is drawn back against the stop 41 by the spring 42.

The latch 32 has a flat face 43 thereon above and at the left-hand side of the pivot 33, Fig. 3. Said face 43 is held normally against a projection 44 on the rocker-arm 34 by a flat spring 45. When the lever 31 is drawn back against the stop 41 by the spring 42, the latch 32 yields and allows said lever to pass without rocking the arm 34.

The operation of the mechanism as a whole is as follows: Assuming the vehicle to be in motion and that the parts are in the respective positions shown in Figs. 1 and 2, the driver should first shut off the throttle by means of the throttle-lever 28 and then apply the brake by operating the treadle 5. If, however, the driver pushes the treadle 5 forward before shutting the throttle by means of the throttle-lever 28, the rocker-arm 23 will close the throttle through the mechanism connecting said arm with said treadle, as hereinbefore described, and a continuation of the forward movement of the treadle will apply the brake after said throttle is closed.

It is evident that various forms of mechanism may be employed whereby the throttle-valve or other device for regulating the supply of motive power to the engine may be operated by the brake mechanism without departing from the spirit of my invention, and in Fig. 5 I have illustrated a modified mechanism for closing the throttle-valve, in which 48 is a hand-lever which takes the place of the lever 28 and is extended below the throttle rock-shaft 24, to which it is fastened. Said lever 48 has a spring-latch 49 pivoted thereto, which engages a lever 50, connected to the brake mechanism by a link 51.

The operation of the lever 50 and the link 51 is the same in relation to the lever 48 as that hereinbefore described of the lever 31 and link 30 in relation to the rocker-arm 34, and the throttle rock-shaft 24 is rocked in the same direction as hereinbefore described to close the throttle-valve 17 when the brake mechanism is operated.

Having thus described my invention, what I claim, and desire by Letters Patent to secure, is—

1. In a motor-vehicle, a throttle rock-shaft, a treadle rock-shaft, an intermediate rock-shaft, a throttle-valve, a throttle-valve stem operatively connected to said throttle rock-shaft, a brake mechanism operatively connected to said treadle rock-shaft, and mechanism connecting said rock-shafts in such a manner that when said treadle rock-shaft is given a forward movement to apply the brake mechanism, said intermediate and throttle rock-shafts will be rocked to close said throttle-valve.

2. In a motor-vehicle, a throttle rock-shaft, a treadle rock-shaft, an intermediate rock-shaft, a throttle-valve, a throttle-valve stem operatively connected to said throttle rock-shaft, a brake mechanism operatively connected to said treadle rock-shaft, and mechanism connecting said rock-shafts in such a manner that when said treadle rock-shaft is given a forward movement to apply the brake mechanism, said intermediate and throttle rock-shafts will be rocked to close said throttle-valve, and means to independently rock said throttle rock-shaft and open and close said throttle-valve.

3. In a motor-vehicle, a throttle rock-shaft, a treadle rock-shaft, an intermediate rock-shaft, a throttle-valve, a throttle-valve stem operatively connected to said throttle rock-shaft, a brake mechanism operatively connected to said treadle rock-shaft, and mechanism connecting said rock-shafts in such a manner that when said treadle rock-shaft is given a forward movement to apply the brake mechanism, said intermediate and throttle rock-shafts will be rocked to close said throttle-valve, and upon the return movement of said treadle rock-shaft said brake mechanism will be released and said throttle-valve will remain closed.

4. In a motor-vehicle, a throttle rock-shaft, a treadle rock-shaft, an intermediate rock-shaft, a throttle-valve, a throttle-valve stem operatively connected to said throttle rock-shaft, a brake mechanism operatively connected to said treadle rock-shaft, and mechanism connecting said rock-shafts in such a manner that when said treadle rock-shaft is given a forward movement to apply the brake mechanism, said intermediate and throttle rock-shafts will be rocked to close said throttle-valve, and upon the return movement of said treadle rock-shaft said throttle and intermediate rock-shafts will remain stationary.

In testimony whereof I have hereunto set my hand in presence of two subscribing witnesses.

WILLIAM WILLMOTT HARMON.

Witnesses:
CHARLES S. GOODING,
WARREN W. C. SPENCER.